United States Patent Office 2,720,452
Patented Oct. 11, 1955

2,720,452
METHOD OF TREATING PLANTS

Frank Earl Denny, Yonkers, N. Y., assignor to Boyce Thompson Institute for Plant Research, Inc., a corporation of New York No Drawing. Application August 21, 1952,
Serial No. 305,697

4 Claims. (Cl. 71—2.7)

This invention relates to the growth of plants and has for its object the provision of an improved method of hastening the sprouting and growth of dormant buds, especially to shorten the period of rest or dormancy.

I have discovered that aqueous solutions of a compound of the group consisting of calcium trichloroacrylate, trichloroacrylic acid, trichloroacetamide, and trichloroacetic acid, are very effective for arresting the dormant period of buds and hastening their sprouting and growth. The dormant buds may be treated by contact with the compounds in any suitable dilute or dispersed form, such as in dusts, vapors, or in solution in water or organic solvents.

One of the advantageous features of the invention is that very small amounts of the compounds are effective, and in view of their low cost, the treatment is relatively inexpensive. Aqueous solutions containing from 0.25% to 1.0% of the compounds have proved to be very effective.

In the treatment of dormant potatoes, for example, the potatoes may be used whole or cut into small pieces each containing one eye or bud and contacted with one of the compounds. One satisfactory method of treating potatoes is to dip them in an aqueous solution, remove them from the solution, store them for a suitable period, say, about twenty hours, and then plant them. The compounds are not highly volatile and the treated potatoes may accordingly be stored in sacks, crates, or field boxes eliminating the need of tightly closed containers, as in certain practices heretofore. In one case, potatoes treated during October developed buds which appeared above the ground in fourteen days.

The compounds of the invention were applied in aqueous solutions containing from 0.5% to 1.0% to potatoes, both cut and whole, at the end of the growing season and when in a dormant state. It was found that solutions containing around 0.5% gave the best results. Larger amounts, around 1.0%, have a tendency to cause some rot and other injury. The potatoes treated according to the invention have such a short dormant period that they may be planted a few days after harvesting and will sprout in about the same time potatoes sprout following the end of their normal dormant period.

This application is a continuation-in-part of application Serial Number 95,385, filed May 25, 1949 and now abandoned.

I claim:

1. The method of treating dormant buds to hasten sprouting which comprises treating the buds with an aqueous solution of a compound of the group consisting of calcium trichloroacrylate, trichloroacrylic acid, trichloroacetamide and trichloroacetic acid in an amount sufficient to hasten sprouting but not in excess of about 1%.

2. The method of treating dormant buds to hasten sprouting which comprises contacting the buds with a compound of the group consisting of calcium trichloroacrylate, trichloroacrylic acid, trichloroacetamide and trichloroacetic acid dispersed in a carrier medium and in an amount sufficient to hasten sprouting but not in excess of about 1%.

3. In the method of claim 2, treating potatoes with a solution containing from 0.25% to 1.0% of one of said compounds.

4. The method of hastening the sprouting of potatoes comprising immersing dormant potatoes in an aqueous solution comprising from 0.25% to 1.0% of a compound of the group consisting of calcium trichloroacrylate, trichloroacrylic acid, trichloroacetamide and trichloroacetic acid.

References Cited in the file of this patent
UNITED STATES PATENTS 2,393,086  Bousquet _____ Jan. 15, 1946

OTHER REFERENCES

"Hormones and Horticulture," by Avery et al., McGraw-Hill (1947), page 243.